(12) United States Patent
Skinner et al.

(10) Patent No.: US 11,908,065 B2
(45) Date of Patent: Feb. 20, 2024

(54) STACK-BASED RAY TRAVERSAL WITH DYNAMIC MULTIPLE-NODE ITERATIONS

(71) Applicants: Advanced Micro Devices, Inc., Santa Clara, CA (US); ATI Technologies ULC, Markham (CA)

(72) Inventors: Daniel James Skinner, Milton Keynes (GB); Michael John Livesley, Milton Keynes (GB); David William John Pankratz, Markham (CA)

(73) Assignees: Advanced Micro Devices, Inc., Santa Clara, CA (US); ATI Technologies ULC, Markham (CA)

( * ) Notice: Subject to any disclaimer, the term of this patent is extended or adjusted under 35 U.S.C. 154(b) by 0 days.

(21) Appl. No.: 17/844,677

(22) Filed: Jun. 20, 2022

(65) Prior Publication Data
US 2023/0298256 A1    Sep. 21, 2023

Related U.S. Application Data

(60) Provisional application No. 63/322,082, filed on Mar. 21, 2022.

(51) Int. Cl.
| | |
|---|---|
| *G06T 15/06* | (2011.01) |
| *G06T 17/10* | (2006.01) |
| *G06T 15/08* | (2011.01) |

(52) U.S. Cl.
CPC ............. *G06T 15/06* (2013.01); *G06T 15/08* (2013.01); *G06T 17/10* (2013.01); *G06T 2210/21* (2013.01)

(58) Field of Classification Search
None
See application file for complete search history.

(56) References Cited

U.S. PATENT DOCUMENTS

| | | | |
|---|---|---|---|
| 10,692,271 B1 | 6/2020 | Saleh | |
| 2017/0309059 A1* | 10/2017 | Howson | .................... G06T 1/20 |
| 2019/0019326 A1* | 1/2019 | Clark | ........................ G06T 15/06 |
| 2019/0156550 A1* | 5/2019 | Stanard | .................... G06T 15/50 |
| 2019/0355166 A1 | 11/2019 | Clark et al. | |
| 2020/0051318 A1 | 2/2020 | Muthler et al. | |
| 2021/0407172 A1* | 12/2021 | Clark | ........................ G06T 7/60 |
| 2021/0407177 A1 | 12/2021 | Janus et al. | |
| 2022/0036639 A1 | 2/2022 | Rabbani Rankouhi et al. | |
| 2022/0068009 A1 | 3/2022 | Wald et al. | |
| 2023/0023323 A1* | 1/2023 | Barnard | .................. G06T 15/06 |

* cited by examiner

*Primary Examiner* — Nurun Flora
(74) *Attorney, Agent, or Firm* — Volpe Koenig

(57) ABSTRACT

A technique for performing ray tracing operations is provided. The technique includes, in response to detecting that a threshold number of traversal stage work-items of a wavefront have terminated, increasing intersection test parallelization for non-terminated work-items.

20 Claims, 7 Drawing Sheets

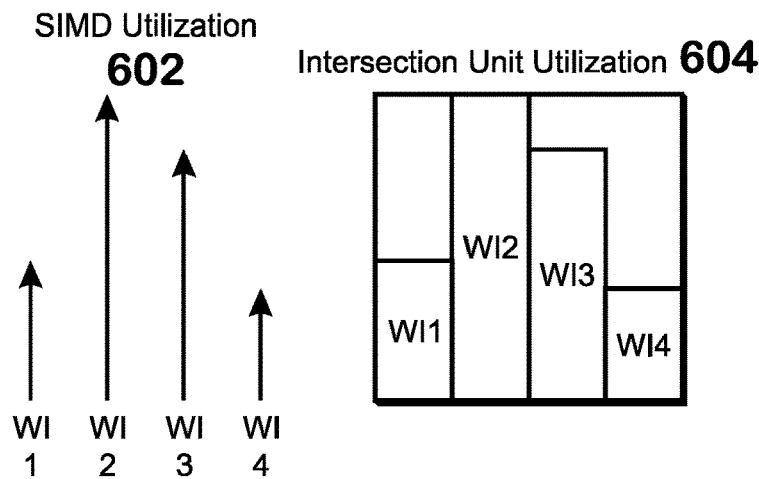
FIG. 6
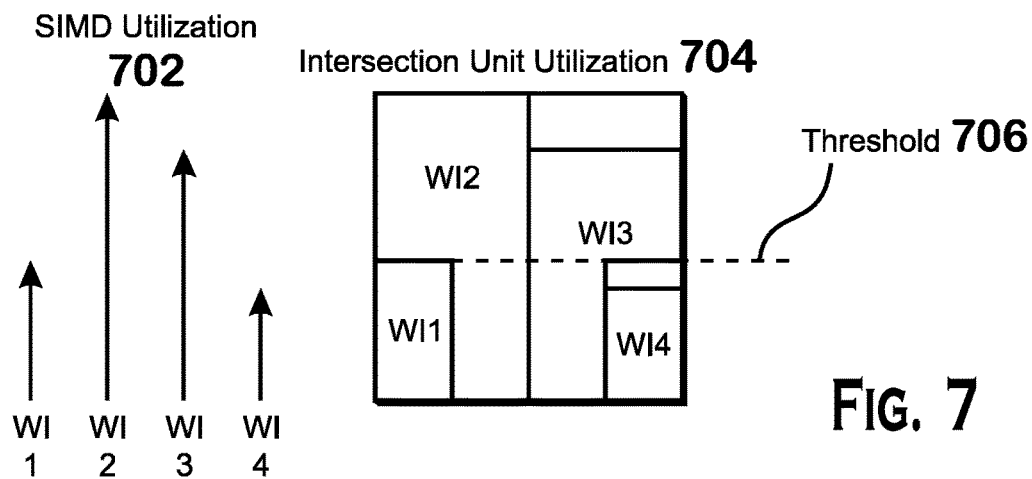
FIG. 7
Single Test Mode
FIG. 8
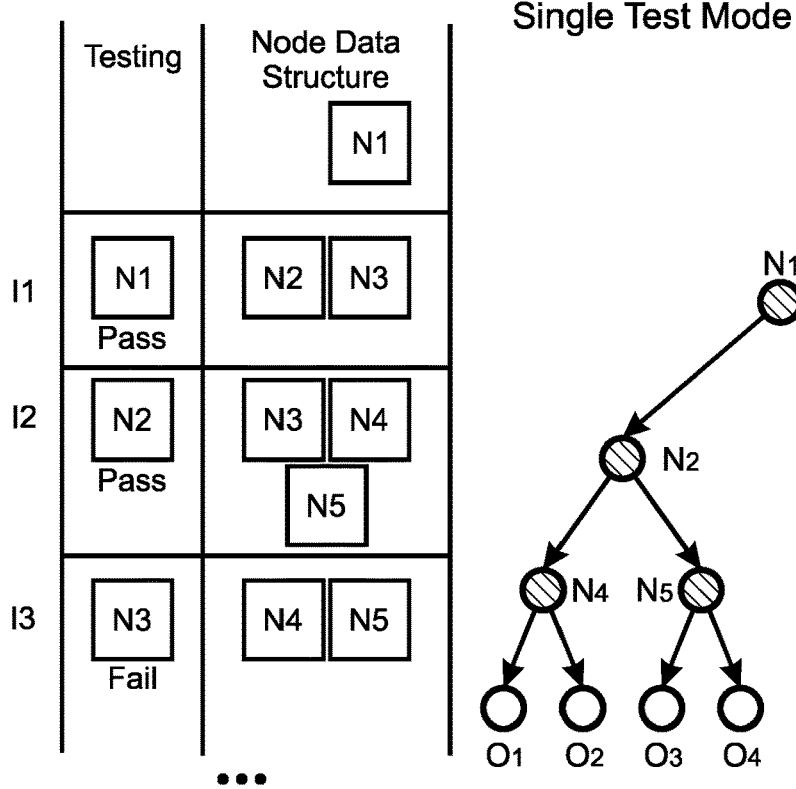

STACK-BASED RAY TRAVERSAL WITH DYNAMIC MULTIPLE-NODE ITERATIONS

CROSS-REFERENCE TO RELATED APPLICATIONS

This application claims the benefit of U.S. Provisional application No. 63/322,082, entitled "STACK-BASED RAY TRAVERSAL WITH DYNAMIC MULTIPLE-NODE ITERATIONS," filed on Mar. 21, 2022, the entirety of which is hereby incorporated herein by reference.

BACKGROUND

Ray tracing is a type of graphics rendering technique in which simulated rays of light are cast to test for object intersection and pixels are colored based on the result of the ray cast. Ray tracing is computationally more expensive than rasterization-based techniques, but produces more physically accurate results. Improvements in ray tracing operations are constantly being made.

BRIEF DESCRIPTION OF THE DRAWINGS

A more detailed understanding may be had from the following description, given by way of example in conjunction with the accompanying drawings wherein:

FIG. 6 illustrates decreasing intersection utilization as work-items of a traversal shader program termination;

FIG. 7 illustrates increasing intersection utilization after a utilization decrease associated with traversal shader program termination;

FIG. 8 illustrates a single test mode for traversing a bounding volume hierarchy;

DETAILED DESCRIPTION

A technique for performing ray tracing operations is provided. The technique includes, in response to detecting that a threshold number of traversal stage work-items of a wavefront have terminated, increasing intersection test parallelization for non-terminated work-items.

Figure 1:
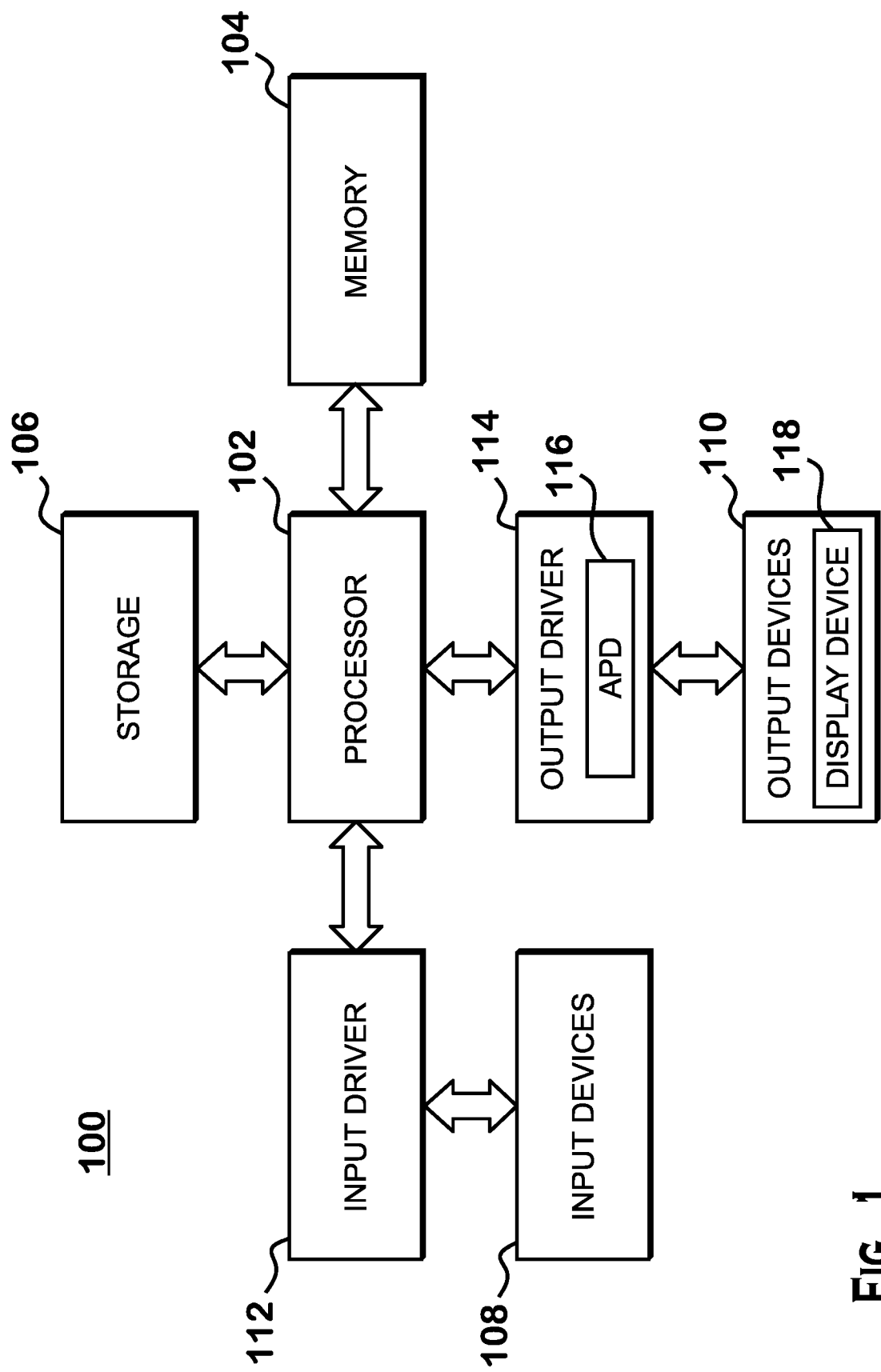
FIG. 1 is a block diagram of an example device in which one or more features of the disclosure can be implemented.

FIG. 1 is a block diagram of an example device 100 in which one or more features of the disclosure can be implemented. The device 100 includes, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 also optionally includes an input driver 112 and an output driver 114. It is understood that the device 100 includes additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display device 118, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. The output driver 114 includes an accelerated processing device ("APD") 116 which is coupled to a display device 118. The APD 116 is configured to accept compute commands and graphics rendering commands from processor 102, to process those compute and graphics rendering commands, and to provide pixel output to display device 118 for display. As described in further detail below, the APD 116 includes one or more parallel processing units configured to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and configured to provide (graphical) output to a display device 118. For example, it is contemplated that any processing system that performs processing tasks in accordance with a SIMD paradigm can be configured to perform the functionality described herein. Alternatively, it is contemplated that computing systems that do not perform processing tasks in accordance with a SIMD paradigm performs the functionality described herein.

Figure 2:
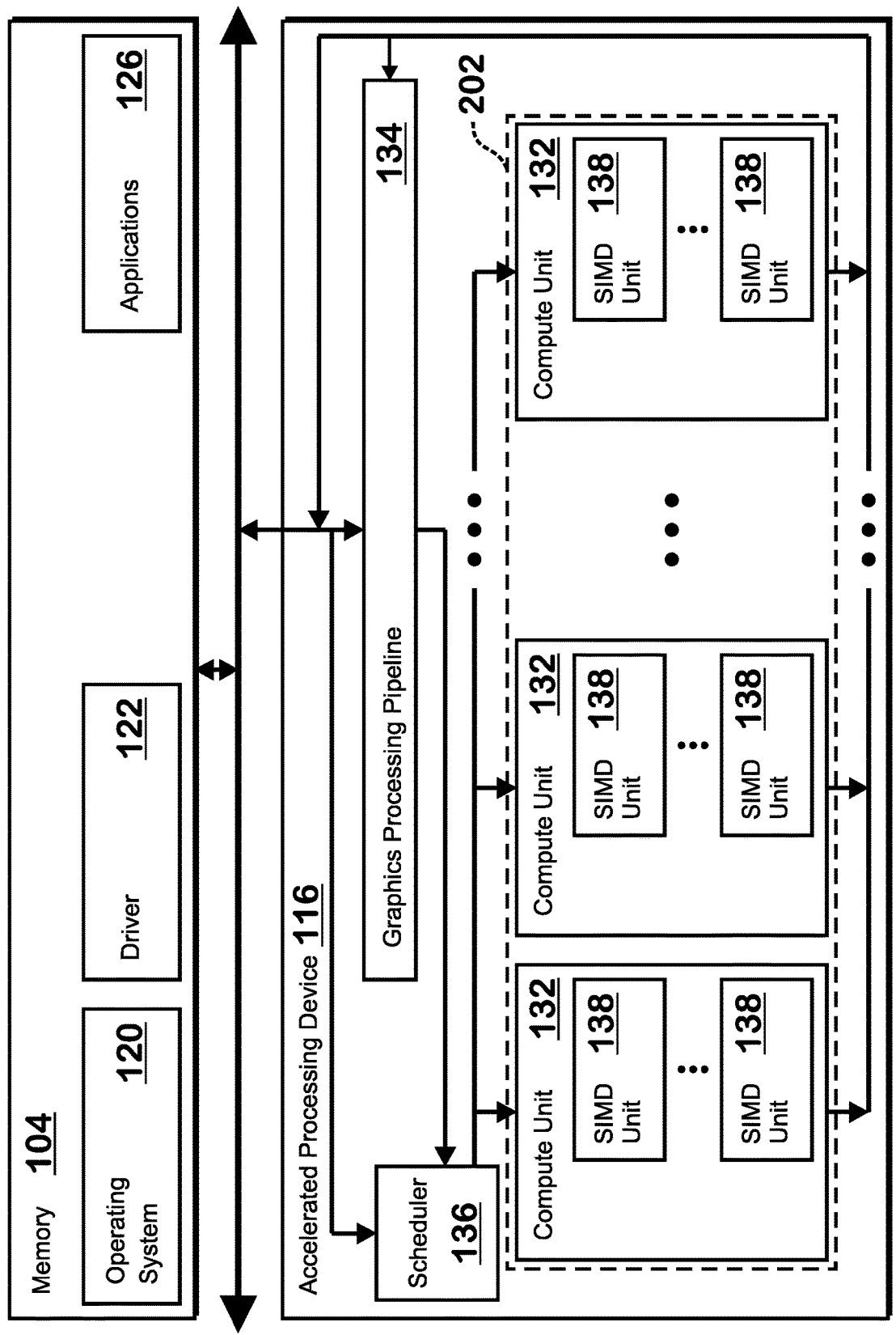
FIG. 2 is a block diagram of the device, illustrating additional details related to execution of processing tasks on the accelerated processing device of FIG. 1, according to an example.

FIG. 2 is a block diagram of the device 100, illustrating additional details related to execution of processing tasks on the APD 116. The processor 102 maintains, in system memory 104, one or more control logic modules for execution by the processor 102. The control logic modules include an operating system 120, a driver 122, and applications 126. These control logic modules control various features of the operation of the processor 102 and the APD 116. For example, the operating system 120 directly communicates with hardware and provides an interface to the hardware for other software executing on the processor 102. The driver 122 controls operation of the APD 116 by, for example, providing an application programming interface ("API") to software (e.g., applications 126) executing on the processor 102 to access various functionality of the APD 116. In some implementations, the driver 122 includes a just-in-time compiler that compiles programs for execution by processing components (such as the SIMD units 138 discussed in further detail below) of the APD 116. In other implementations, no just-in-time compiler is used to compile the programs, and a normal application compiler compiles shader programs for execution on the APD 116.

The APD 116 executes commands and programs for selected functions, such as graphics operations and non-graphics operations that are suited for parallel processing and/or non-ordered processing. The APD 116 is used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more SIMD units 138 that perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but executes that instruction with different data. Lanes can be switched off with predication if not all lanes are to execute a given instruction. Predication can be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow. In an implementation, each of the compute units 132 can have a local L1 cache. In an implementation, multiple compute units 132 share a L2 cache.

The basic unit of execution in compute units 132 is a work-item. Each work-item represents a single instantiation of a program that is to be executed in parallel in a particular lane. Work-items can be executed simultaneously as a "wavefront" on a single SIMD processing unit 138. One or more wavefronts are included in a "work group," which includes a collection of work-items designated to execute the same program. A work group is executed by executing each of the wavefronts that make up the work group. In alternatives, the wavefronts are executed sequentially on a single SIMD unit 138 or partially or fully in parallel on different SIMD units 138. Wavefronts can be thought of as a collection of work-items that can be executed simultaneously on a single SIMD unit 138, although it is possible for wavefronts to be divided into sets of work-items, each of which is executed simultaneously on a single SIMD unit 138. A scheduler 136 is configured to perform operations related to scheduling various wavefronts on different compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

The compute units 132 implement ray tracing, which is a technique that renders a 3D scene by testing for intersection between simulated light rays and objects in a scene. Much of the work involved in ray tracing is performed by programmable shader programs, executed on the SIMD units 138 in the compute units 132, as described in additional detail below.

Figure 3:
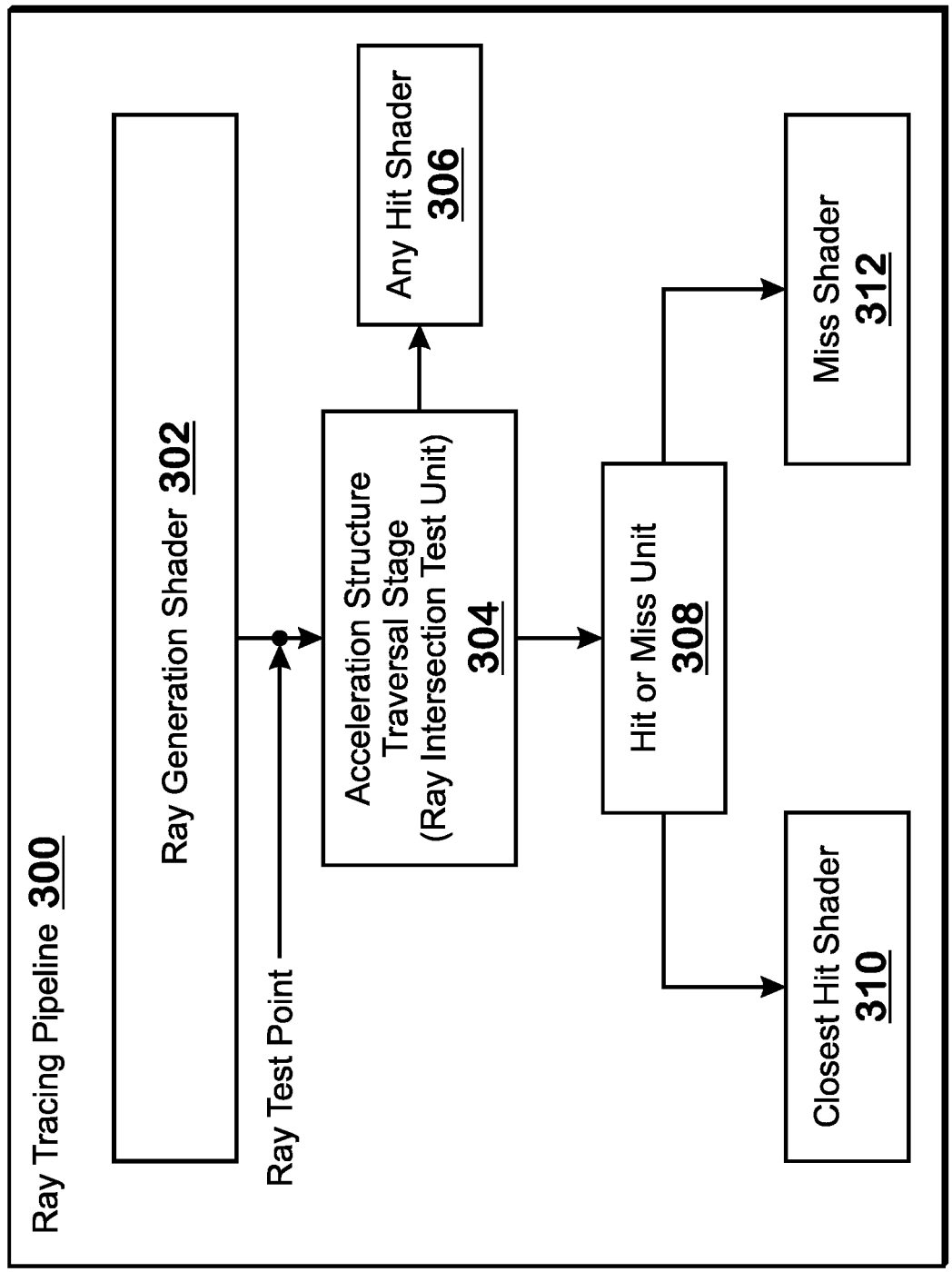
FIG. 3 illustrates a ray tracing pipeline for rendering graphics using a ray tracing technique, according to an example.

FIG. 3 illustrates a ray tracing pipeline 300 for rendering graphics using a ray tracing technique, according to an example. The ray tracing pipeline 300 provides an overview of operations and entities involved in rendering a scene utilizing ray tracing. In some implementations, a ray generation shader 302, any hit shader 306, closest hit shader 310, and miss shader 312 are shader-implemented stages that represent ray tracing pipeline stages whose functionality is performed by shader programs executing in the SIMD unit 138. Any of the specific shader programs at each particular shader-implemented stage are defined by application-provided code (i.e., by code provided by an application developer that is pre-compiled by an application compiler and/or compiled by the driver 122). In other implementations, any of the ray generation shader 302, any hit shader 306, closest hit shader 310, and miss shader 312 are implemented as software executed on any type of processor and that performs the operations described herein, circuitry that performs the operations described herein, or a combination of hardware circuitry and software executing on a processor. The acceleration structure traversal stage 304 performs a ray intersection test to determine whether a ray hits a triangle.

The ray tracing pipeline 300 indicates the path through which a ray tracing operation flows. To render a scene using ray tracing, a rendering orchestrator, such as a program executing on the processor 102, designates a collection of geometry as a "scene." Various objects in the scene are represented as collections of geometry primitives, which are often triangles, but could be any geometric shape. The term "triangle" when used herein, refers to these geometric primitives that compose a scene. The rendering orchestrator renders the scene by designating a camera position and an image and requesting rays be traced from the camera through the image. The ray tracing pipeline 300 performs the various operations described herein to determine colors for the rays. The ray tracing pipeline 300 designates colors for the pixels of the image, based on the results of ray tracing operations for rays traced through the image. For example, a ray that hits a green triangle and passes through a particular screen position in the image is able to color the pixel corresponding to that screen position green.

Colors are often derived from the triangles that are intersected by the rays. As described elsewhere herein, a ray that hits no triangle invokes a miss shader 312. One possible operation for the miss shader 312 is to color the ray with a color from the "skybox," which is an image that is designated as representing the ambient scene where no geometry is present (for example, a scene with no geometry would render only the skybox). Colors for pixels in the image are determined based on the point of intersection between the ray and the image position. In some examples, after a sufficient number of rays are traced and the pixels of the image have been designated colors, the image is displayed on a screen or is used in some other manner.

In some implementation where the shader stages of the ray tracing pipeline 300 are implemented in software, the various programmable shader stages (ray generation shader 302, any hit shader 306, closest hit shader 310, miss shader 312) are implemented as shader programs that execute on the SIMD units 138. The acceleration structure traversal stage 304 is implemented in software (e.g., as a shader program executing on the SIMD units 138), in hardware, or as a combination of hardware and software. The hit or miss unit 308 is implemented in any technically feasible manner, such as as part of any of the other units, implemented as a hardware accelerated structure, or implemented as a shader program executing on the SIMD units 138. The ray tracing pipeline 300 is, in various implementations, orchestrated partially or fully in software or partially or fully in hardware, and may be orchestrated by the processor 102, the scheduler 136, by a combination thereof, or partially or fully by any other hardware and/or software unit. In examples, traversal through the ray tracing pipeline 300 is performed partially or fully by the scheduler 136, either autonomously or under control of the processor 102, or partially or fully by a shader program (such as a bounding volume hierarchy traversal shader program) executing on one or more of the SIMD units 138. In some examples, testing a ray against boxes and triangles (inside the acceleration structure traversal stage 304) is hardware accelerated (meaning that a fixed function hardware unit performs the steps for those tests). In other examples, such testing is performed by software such as a shader program executing on one or more SIMD units 138. Herein, where the phrase "the ray tracing pipeline does [an action]" is used, this means that the hardware and/or software that implements the ray tracing pipeline 300 does that action. Although described as executing on the SIMD unit 138 of FIG. 3, it should be understood that in other implementations, other hardware, having or not having SIMD capabilities (e.g., the processor 102), alternatively executes the shader programs of the illustrated ray tracing pipeline 300.

The ray tracing pipeline 300 operates in the following manner. A ray generation shader 302 is executed. The ray generation shader 302 sets up data for a ray to test against triangles of a scene and requests the acceleration structure traversal stage 304 test the ray for intersection with triangles.

The acceleration structure traversal stage 304 traverses an acceleration structure, which is a data structure that describes a scene volume and objects (such as triangles) within the scene, and tests the ray against triangles in the scene. In various examples, the acceleration structure is a bounding volume hierarchy. The hit or miss unit 308, which, in some implementations, is part of the acceleration structure traversal stage 304, determines whether the results of the acceleration structure traversal stage 304 (which may include raw data such as barycentric coordinates and a potential time to hit) actually indicates a hit. For triangles that are hit, the ray tracing pipeline 300 triggers execution of the any hit shader 306. Note that multiple triangles can be hit by a single ray. It is not guaranteed that the acceleration structure traversal stage will traverse the acceleration structure in the order from closest-to-ray-origin to farthest-from-ray-origin. The hit or miss unit 308 triggers execution of a closest hit shader 310 for the triangle closest to the origin of the ray that the ray hits, or, if no triangles were hit, triggers a miss shader.

It is possible for the any hit shader 306 to "reject" a hit from the ray intersection test unit 304, and thus the hit or miss unit 308 triggers execution of the miss shader 312 if no hits are found or accepted by the ray intersection test unit 304. An example circumstance in which an any hit shader 306 may "reject" a hit is when at least a portion of a triangle that the ray intersection test unit 304 reports as being hit is fully transparent. Because the ray intersection test unit 304 only tests geometry, and not transparency, the any hit shader 306 that is invoked due to a hit on a triangle having at least some transparency may determine that the reported hit is actually not a hit due to "hitting" on a transparent portion of the triangle. A typical use for the closest hit shader 310 is to color a material based on a texture for the material. A typical use for the miss shader 312 is to color a pixel with a color set by a skybox. It should be understood that the closest hit shader 310 and miss shader 312 may implement a wide variety of techniques for coloring pixels and/or performing other operations. In instances in which these shaders are implemented as programmable shader stages executing shader programs, different shader programs used for the same application are capable of coloring pixels in different ways.

A typical way in which the ray generation shader 302 generates rays is with a technique referred to as backwards ray tracing. In backwards ray tracing, the ray generation shader 302 generates a ray having an origin at the point of the camera. The point at which the ray intersects a plane defined to correspond to the screen (the "image" above) defines the pixel on the screen whose color the ray is being used to determine. If the ray hits an object, that pixel is colored based on the closest hit shader 310. If the ray does not hit an object, the pixel is colored based on the miss shader 312. Multiple rays may be cast per pixel, with the final color of the pixel being determined by some combination of the colors determined for each of the rays of the pixel. As described elsewhere herein, it is possible for individual rays to generate multiple samples, which each sample indicating whether the ray hits a triangle or does not hit a triangle. In an example, a ray is cast with four samples. Two such samples hit a triangle and two do not. The triangle color thus contributes only partially (for example, 50%) to the final color of the pixel, with the other portion of the color being determined based on the triangles hit by the other samples, or, if no triangles are hit, then by a miss shader. In some examples, rendering a scene involves casting at least one ray for each of a plurality of pixels of an image to obtain colors for each pixel. In some examples, multiple rays are cast for each pixel to obtain multiple colors per pixel for a multi-sample render target. In some such examples, at some later time, the multi-sample render target is compressed through color blending to obtain a single-sample image for display or further processing.

It is possible for any of the any hit shader 306, closest hit shader 310, and miss shader 312, to spawn their own rays, which enter the ray tracing pipeline 300 at the ray test point. These rays can be used for any purpose. One common use is to implement environmental lighting or reflections. In an example, when a closest hit shader 310 is invoked, the closest hit shader 310 spawns rays in various directions. For each object, or a light, hit by the spawned rays, the closest hit shader 310 adds the lighting intensity and color to the pixel corresponding to the closest hit shader 310. It should be understood that although some examples of ways in which the various components of the ray tracing pipeline 300 can be used to render a scene have been described, any of a wide variety of techniques may alternatively be used.

As described above, the determination of whether a ray hits an object is referred to herein as a "ray intersection test." The ray intersection test involves shooting a ray from an origin and determining whether the ray hits a triangle and, if so, what distance from the origin the triangle hit is at. For efficiency, the ray tracing test uses a representation of space referred to as a bounding volume hierarchy. This bounding volume hierarchy is the "acceleration structure" described above. In an example bounding volume hierarchy, each non-leaf node represents an axis aligned bounding box that bounds the geometry of all children of that node. In an example, the base node represents the maximal extents of an entire region for which the ray intersection test is being performed. In this example, the base node has two children that each represent mutually exclusive axis aligned bounding boxes that subdivide the entire region. Each of those two children has two child nodes that represent axis aligned bounding boxes that subdivide the space of their parents, and so on. Leaf nodes represent a triangle against which a ray test can be performed.

The bounding volume hierarchy data structure allows the number of ray-triangle intersections (which are complex and thus expensive in terms of processing resources) to be reduced as compared with a scenario in which no such data structure were used and therefore all triangles in a scene would have to be tested against the ray. Specifically, if a ray does not intersect a particular bounding box, and that bounding box bounds a large number of triangles, then all triangles in that box can be eliminated from the test. Thus, a ray intersection test is performed as a sequence of tests of the ray against axis-aligned bounding boxes, followed by tests against triangles.

Figure 4:
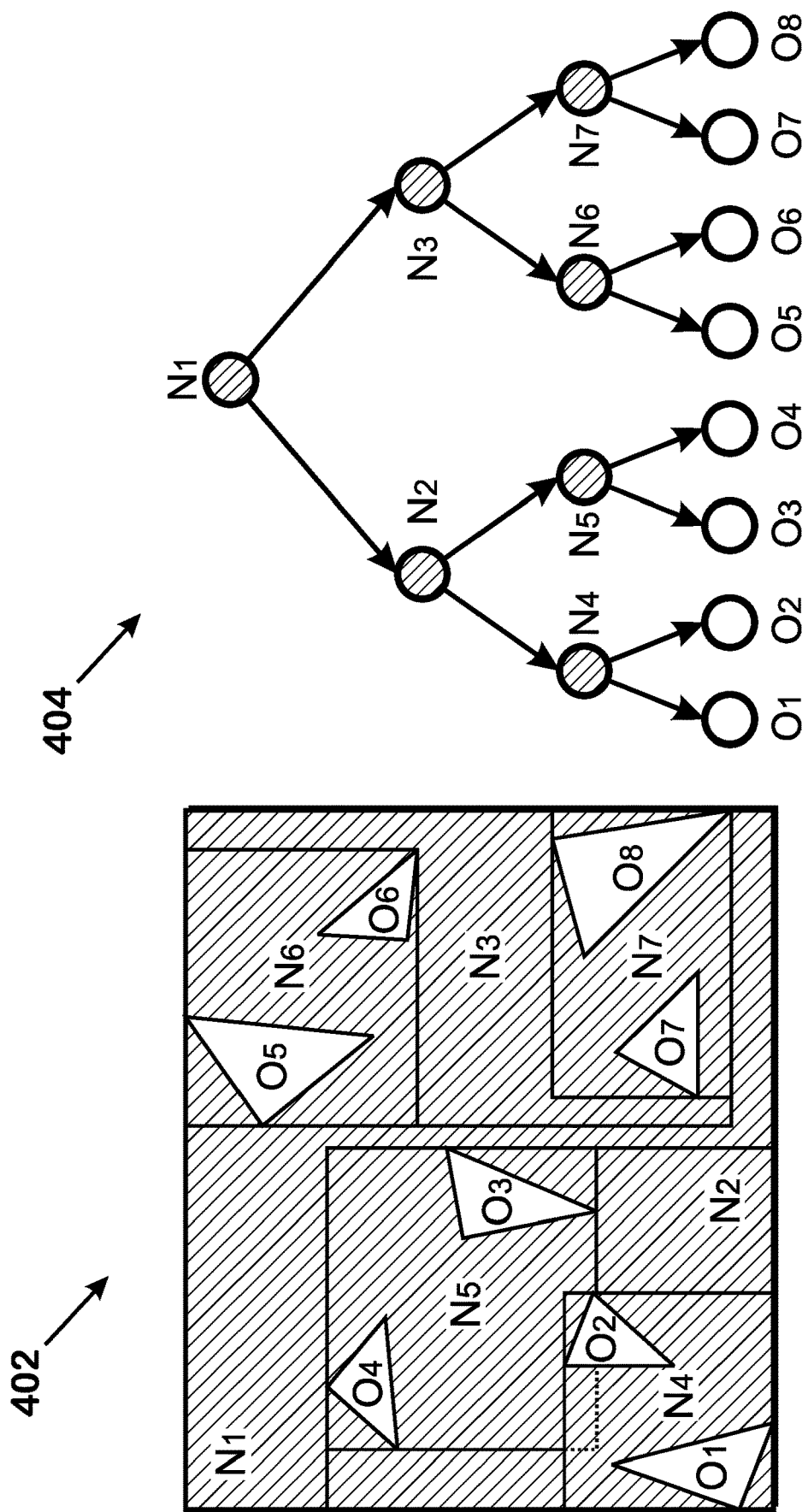
FIG. 4 is an illustration of a bounding volume hierarchy, according to an example.

FIG. 4 is an illustration of a bounding volume hierarchy, according to an example. For simplicity, the hierarchy is shown in 2D. However, extension to 3D is simple, and it should be understood that the tests described herein would generally be performed in three dimensions.

The spatial representation 402 of the bounding volume hierarchy is illustrated in the left side of FIG. 4 and the tree representation 404 of the bounding volume hierarchy is illustrated in the right side of FIG. 4. The non-leaf nodes are represented with the letter "N" and the leaf nodes are represented with the letter "O" in both the spatial representation 402 and the tree representation 404. A ray intersection test would be performed by traversing through the tree 404, and, for each non-leaf node tested, eliminating branches below that node if the box test for that non-leaf node fails. For leaf nodes that are not eliminated, a ray-triangle intersection test is performed to determine whether the ray intersects the triangle at that leaf node. For non-leaf nodes that are not eliminated, the ray intersection test would intersect the ray with such non-eliminated nodes, to determine whether children of such nodes should be eliminated from consideration. For leaf nodes or non-leaf nodes that are eliminated, the ray intersection test does not perform an intersection test of the ray with such nodes. In sum, to perform an intersection test for a ray, the ray racing pipeline 300 begins with one or more starting non-leaf nodes and tests one or more of those non-leaf nodes for intersection with the ray. The ray tracing pipeline 300 follows the edges of the bounding volume hierarchy, testing non-leaf nodes against the ray to either eliminate or not eliminate children of those nodes. For leaf nodes encountered by the ray tracing pipeline 300, the ray tracing pipeline 300 tests the ray against such nodes to determine whether the ray intersects the geometry associated with such leaf nodes.

In an example, the ray intersects $O_5$ but no other triangle. The test would test against $N_1$, determining that that test succeeds. The test would test against $N_2$, determining that the test fails (since $O_5$ is not within $N_1$). The test would eliminate all sub-nodes of $N_2$ and would test against $N_3$, noting that that test succeeds. The test would test $N_6$ and $N_7$, noting that $N_6$ succeeds but $N_7$ fails. The test would test $O_5$ and $O_6$, noting that $O_5$ succeeds but $O_6$ fails. Instead of testing 8 triangle tests, two triangle tests ($O_5$ and $O_6$) and five box tests ($N_1$, $N_2$, $N_3$, $N_6$, and $N_7$) are performed.

As described herein, non-leaf nodes are associated with bounding boxes that bound the geometry of the children of those non-leaf nodes. Leaf nodes are associated with geometry of the scene against which rays are tested. A variety of geometry types may exist. Some example geometry types for leaf nodes are triangles and procedural geometry, although this is not an exhaustive list. Procedural geometry is geometry whose intersection with a ray is defined procedurally, rather than as data. More specifically, procedural geometry is associated with leaf nodes, and represents the geometry that a ray is tested against to determine whether a ray hits the geometry of such leaf nodes. In the process of traversing a bounding volume hierarchy, in response to the ray tracing pipeline 300 encountering a leaf node that has associated procedural geometry, the ray tracing pipeline 300 triggers execution of a procedure, such as one specified in a shader program (or through other means), to determine whether the ray intersects that procedural geometry. Thus the test for intersection with a procedure is defined procedurally.

Figure 5:
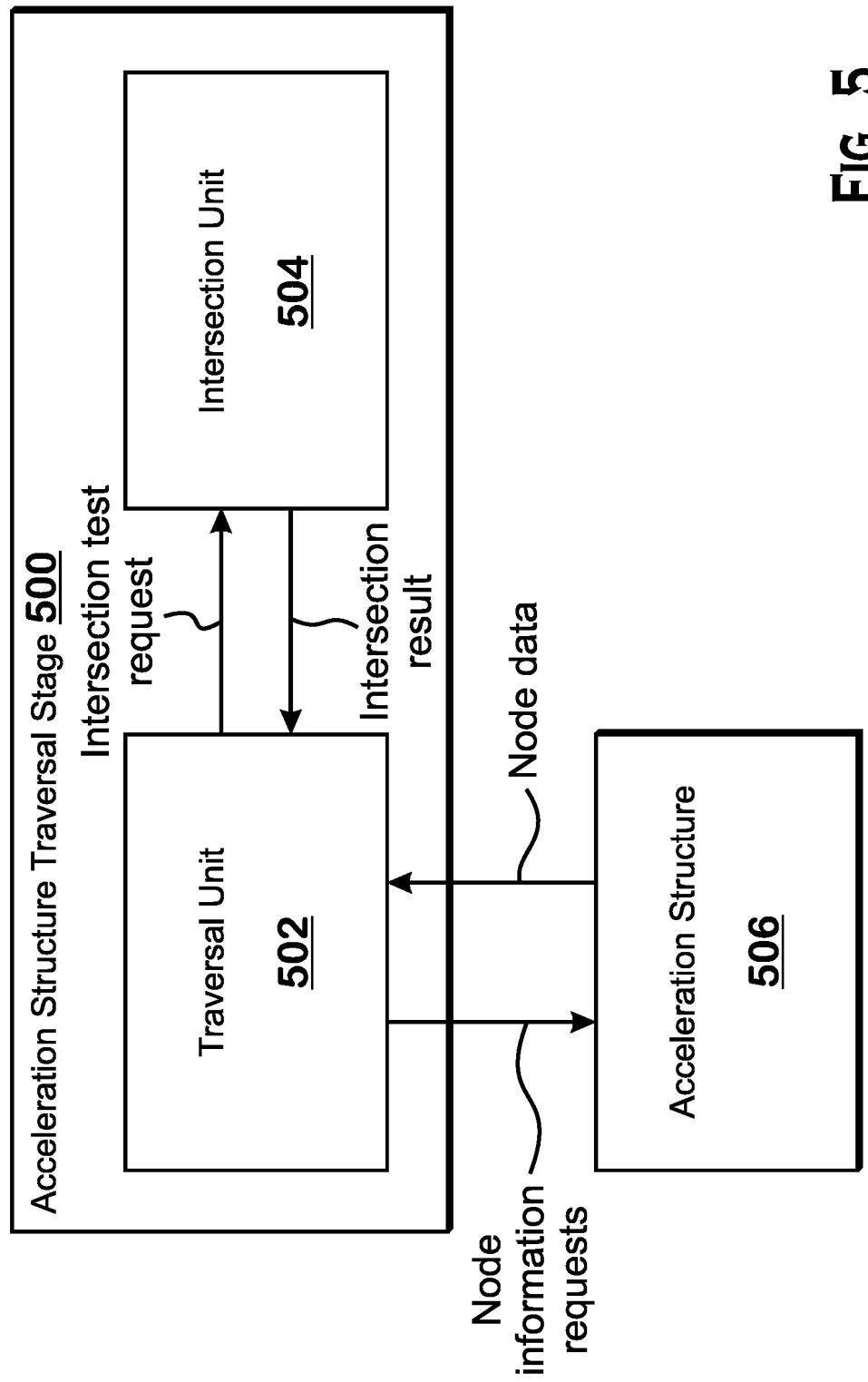
FIG. 5 is a block diagram of an acceleration structure traversal stage, according to an example.

FIG. 5 is a block diagram of an acceleration structure traversal stage 500, according to an example. In some implementations, the acceleration structure traversal stage 304 of FIG. 3 is the acceleration structure traversal stage 500 of FIG. 5.

The acceleration structure traversal stage 500 includes a traversal unit 502 and an intersection unit 504. The traversal unit 502 accepts a request to test a ray for intersection with geometry in a scene. The traversal unit 502 traverses the nodes of the acceleration structure 506, requesting and obtaining node data from the acceleration structure 506, and requests intersection tests be performed by the intersection unit 504. The intersection unit 504 performs the requested intersection tests for the traversal unit 502 and returns the results of the intersection tests to the traversal unit 502. Although a particular hardware configuration is shown (traversal unit 502 and intersection unit 504), the operations described as being performed by these units can be performed by any hardware, software, or combination of hardware and software.

In an example, the traversal unit 502 receives a ray to test for intersection with the geometry of the scene represented by the acceleration structure 506. The traversal unit 502 reads a first non-leaf node (in an example, N2 from bounding volume hierarchy 404 of FIG. 4) from the acceleration structure 506 and requests that the intersection unit 504 test the ray against the geometry of that node. The intersection unit 504 performs that test and returns the test result to the traversal unit. The result indicates that the ray does not intersect the box and therefore eliminates children of the non-leaf node from consideration. Subsequently, the traversal unit 502 reads another non-leaf node (in an example, N3) from the acceleration structure 506 and requests that the intersection unit 504 test the ray against the geometry of that node. The intersection unit 504 performs that test and returns the test result to the traversal unit 502. The test result indicates that the ray intersects the box associated with that node and therefore the traversal unit 502 continues with testing the children of that non-leaf node (in the example, nodes N6 and N7).

In various implementations, the traversal unit 502 and intersection unit 504 are implemented as software executing on a programmable processor, hard-wired circuitry, or a combination thereof. In one example implementation, the traversal unit 502 is a shader program (a "traversal shader program") executing on one or more compute units 132. The intersection unit 504 is dedicated hardware circuitry configured to perform intersection tests, such as ray-triangle and ray-box intersection tests. The traversal shader program executes instructions of an instruction set architecture which includes at least one instruction to request that the intersection unit 504 perform an intersection test for the ray. In some implementations, for procedural geometry, the traversal shader program triggers execution of a set of instructions for testing the ray against procedural geometry. In other implementations, the traversal unit 502 is a hard-wired circuitry unit that performs the operations described herein.

As described above, in some examples, the traversal unit 502 uses a traversal shader program to traverse the bounding volume hierarchy to determine intersection information for a ray. These traversal shader programs execute in a SIMD manner in the compute units 132. Each work-item executes for a single ray. As described above, the work-items execute in parallel, such that multiple work-items are traversing a bounding volume hierarchy for multiple rays in parallel.

Executing a traversal shader program involves performing a series of iterations. In each iteration, the traversal shader program identifies at least one node of the BVH to test a ray against and requests the intersection unit 504 test the ray against that node. If the identified node is a box node and the ray is determined to intersect that node, then the traversal shader program identifies the children of that box as nodes for testing in subsequent iterations, and requests the ray be tested against those children in the subsequent iterations. For a leaf node, if a hit is detected, the intersection unit 504 triggers execution of an appropriate shader program as described with respect to FIG. 3.

The traversal shader program executes in "lockstep," in a SIMD manner, to the degree possible, with each work-item representing a different ray. More specifically, performing ray tracing involves testing multiple rays against a scene and coloring pixels according to the results of such tests. Multiple rays are parallelized in a SIMD manner, and work for testing such rays against the scene is executed as a plurality of wavefronts. In an example, the traversal shader program identifies a node to test for each work-item (and thus each ray) of a wavefront in parallel, requests intersection tests be performed by the intersection unit 504 in parallel, and performs other operations in parallel. The intersection unit 504 thus has a certain capacity, in that the intersection unit 504 is capable of performing a certain number of intersection tests over a certain period of time. The acceleration structure traversal stage 304 is considered to have higher occupancy when the acceleration structure traversal stage 304 is performing a larger number of intersection tests in a given amount of time, and is considered to have lower occupancy when the acceleration structure traversal stage 304 is performing a smaller number of intersection tests in a given amount of time.

Work-items executing a traversal shader as a wavefront can end execution at different times. This is because of the nature of ray tracing and BVH traversal. More specifically, intersection tests can be designated to terminate at various points. For example, some intersection tests are designated to end after any hit with a leaf node occurs, other intersection tests are designated to end after a closest hit with a leaf node occurs, and other variations are possible. These different modes, as well as the fact that different rays point in different directions and thus intersect with different geometry, means that different rays will require a different number of iterations through the traversal shader before completion. This fact means that the intersection unit 504 can have lower and lower utilization as the wavefront executing the traversal shader proceeds. More specifically, as more work-items terminate, fewer intersection tests are requested at the intersection unit 504, which results in lower utilization of the intersection unit 504.

FIG. 6 illustrates the difference in utilization as a wavefront executing a traversal shader proceeds, according to an example. The SIMD utilization 602 illustrates the work-items (abbreviated "WI") proceeding to completion. Each work-item corresponds to an arrow and the point of termination of an arrow corresponds to the end of execution of the work item. It can be seen that the utilization of the intersection unit reduces as more work-items proceed to completion. As the work-items complete, the intersection unit 504 is less utilized. Space not occupied by a work-item bar in the intersection unit utilization graph 604 corresponds to idle time for the intersection unit 504.

FIG. 7 illustrates a technique for improving utilization of the intersection unit 504, according to an example. In FIG. 7, once the SIMD utilization drops below a threshold 706 (e.g., below 50%), the traversal shader switches to a wide mode. In the wide mode, each work-item increases the utilization of the intersection unit so that the total utilization of the intersection unit 504 is increased. In some examples, the threshold is 50%, and the work-items increase utilization of the intersection unit by a factor of 2 (e.g., each work-item requests that twice the number of intersection tests be performed). The term "SIMD utilization" means the ratio of the number of work-items of a wavefront that are still executing to the number of work-items that the wavefront launched with. SIMD utilization for a wavefront decreases as threads of a wavefront terminate. In FIG. 7, once two of the four work-items have terminated (indicated by the threshold), work-item 2 and work-item 3 requests twice as many intersection tests. Herein, the term "utilization of the intersection unit 504" is sometimes used. This term means utilization of hardware resources used for performing an intersection test. In some examples, a SIMD unit includes a certain number of copies of such hardware resources and as work-items terminate, more of those hardware resources become idle. It can be seen that the SIMD utilization graph 702 indicates work-item 1 and work-item 4 terminate. At this point, the intersection unit utilization graph 704 indicates that work-item 2 and work-item 3 increase their utilization of the intersection unit 504.

In some examples, a work-item increases utilization of the intersection unit by increasing the number of ray-intersection tests every iteration. More specifically, in some examples, the traversal shader executes a series of iterations. In each iteration, the traversal shader fetches a node from a node data structure that represents the set of acceleration structure nodes that are ready for testing and tests the ray for intersection with the node. If the node is a box node and the ray intersects the box node, then the traversal shader places all children of that box node into the node data structure. If the node is a box node and the ray does not intersect the box node, then the traversal shader does not modify the node data structure. For ray intersection tests against a non-leaf node, the traversal shader performs operations depending on the intersection test mode for the traversal shader. For example, if the mode is to terminate after any hit is detected, then after a hit with a leaf node is detected, the traversal shader terminates execution after detecting a hit with a leaf node. If the mode is to determine the closest hit, then the traversal shader terminates execution after a hit with a leaf node if the traversal shader determines that a closest hit has been detected. In some examples, the traversal shader terminates after determining that no hits with a leaf node have occurred. After the intersection test is performed, if the traversal shader is not terminated, and if there are still nodes in the node data structure, the traversal shader returns to the beginning of the iteration and repeats these operations. If there are no nodes left in the data structure, then the traversal shader terminates.

In some examples, the traversal shader increases utilization of the intersection unit 504 after the number of terminated work-items has reached the threshold by increasing the number of nodes tested for intersection with the ray in each iteration. At this point, each work-item that is still executing is performing multiple intersection tests in parallel. In essence, this technique converts parallelism across work-items to parallelism within work-items. Put differently, initially, the intersection unit 504 is used in parallel by each different work-item. Thus the intersection unit 504 performs intersection tests in parallel for each different work-item (and thus for each different ray). After the threshold number of work-items have terminated, each work-item exhibits some parallelism of use of the intersection unit 504, which results from performing the ray intersection test for multiple nodes of the BVH in each iteration.

Figure 9:
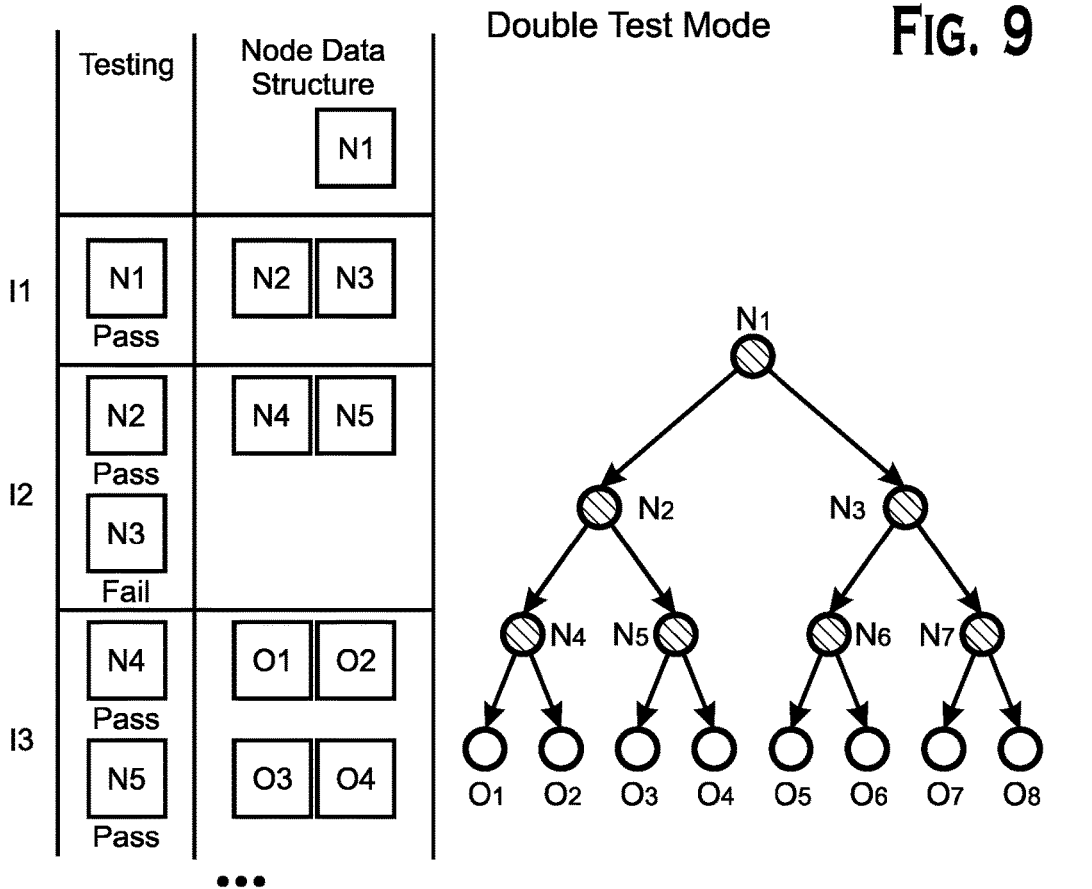
FIG. 9 illustrates a double test mode for traversing a bounding volume hierarchy.

FIGS. 8 and 9 illustrate examples in which different numbers of nodes are tested in each iteration. In FIG. 8, one node is tested in each iteration and in FIG. 9, two nodes are tested in each iteration. The iterations are labeled with the letter I and then the iteration number. For example, iteration 1 is labeled with I1, iteration 2 is labeled with I2, and so on. In each iteration, a work-item either tests one node or tests multiple nodes concurrently. In an example, testing the multiple nodes concurrently means that the work-item requests the intersection unit 504 perform tests for multiple nodes in an at least partially overlapping time period. In an example, the intersection unit 504 is pipelined, such that when a work-item requests in quick succession that two intersection tests be performed for two rays (for example, by executing two instructions back-to-back, where the instructions request the intersection unit 504 perform an intersection test), work for the first such intersection test is still being processed in the intersection unit 504 while the second intersection test is sent to the intersection unit 504 for processing. Both tests then continue processing in the intersection unit 504 to completion. In another example, an instruction may specify multiple intersection tests at the same time, so that the intersection unit 504 can process multiple intersection tests simultaneously. As described above, the intersection unit 504 is capable of processing tests for a plurality of work-items (e.g., 16) simultaneously, but this capability can be utilized by a smaller number of work-items requesting a larger number of intersection tests as described elsewhere herein.

FIG. 8 illustrates a mode in which work-items execute a single intersection test per iteration. In iteration 1, node N1 is tested and passes, and thus nodes N2 and N3 are placed in the node data structure. In iteration 2, node N2 is tested and passes, and thus nodes N4 and N5 are placed into the node data structure. In iteration 3, node N3 is tested and fails. Additional iterations are not shown, but would continue in a similar pattern. As can be seen, the work-item represented in FIG. 8 performs one test per iteration and places any nodes that are the result of that test into the node data structure as a result of that test. Specifically, if the node is a box node and the test passes, then the work-item places the children of that node into the node data structure. If the node is a box node and the test fails, then the work-item does not place the children of that node into the node data structure.

FIG. 9 illustrates a mode in which work-items execute multiple intersection tests per iteration. In iteration 1, node N1 is tested and passes, and thus nodes N2 and N3 are placed in the node data structure. In iteration 2, nodes N2 and N3 are tested. N2 passes and N3 fails. Thus nodes N4 and N5 are placed into the node data structure. In iteration 3, nodes N4 and N5 are tested and both pass. Thus nodes O1, O2, O3, and O4 are placed into the node data structure.

It should be understood that FIG. 8 illustrates a mode of operation before the wavefront has not yet reached the threshold amount of utilization (and thus each work-item is performing work for one intersection test in each iteration). By contrast, FIG. 9 illustrates a mode of operation after the wavefront has reached the threshold amount of utilization, and thus each work-item is performing work for multiple intersection tests in each iteration.

It can be seen that the double test mode of FIG. 9 has twice the utilization of the intersection unit 504 as compared with the single test mode of FIG. 8. Thus, switching to the mode illustrated in FIG. 9 improves the utilization of the intersection unit 504 after the total utilization of the workgroup has decreased past the threshold.

It is possible for the operations described herein to violate determinism, which is a requirement of certain graphics rendering application programming interfaces. Here, "determinism" means that the same result would occur, given the same ray and BVH. Determinism could potentially be broken because the order of traversal through the BVH is dependent on whether the double test mode or single test mode is performed, and which test is used can change while the traversal shader is executing. To ensure determinism, the following rules are applied. First, if an iteration causes a box node and a triangle node from the same parent node to be placed into the node data structure, then the triangle node must be placed into the node data structure in such a manner that the triangle node will be retrieved from the data structure before the box node. In an example where the node data structure is a stack, the box node is pushed onto the stack and then the triangle node is pushed onto the stack. Second, if an iteration would retrieve a triangle node after retrieving any number of box nodes, then the iteration should not test the triangle or any nodes retrieved after the triangle for intersection. In effect, the above rules enforce depth first testing of triangle nodes, which ensures determinism.

It should be understood that although modes testing two nodes per iteration are described, alternative or additionally, modes testing more than two nodes (such as four or eight) per iteration are contemplated. In some examples, instead of one threshold, multiple thresholds such as two or three are used. For example, when the number of executing work-items drops to one half of the total, two nodes are tested per iteration. When the number of executing work-items drops to one quarter of the total, four nodes are tested per iteration, and so on.

Figure 10:
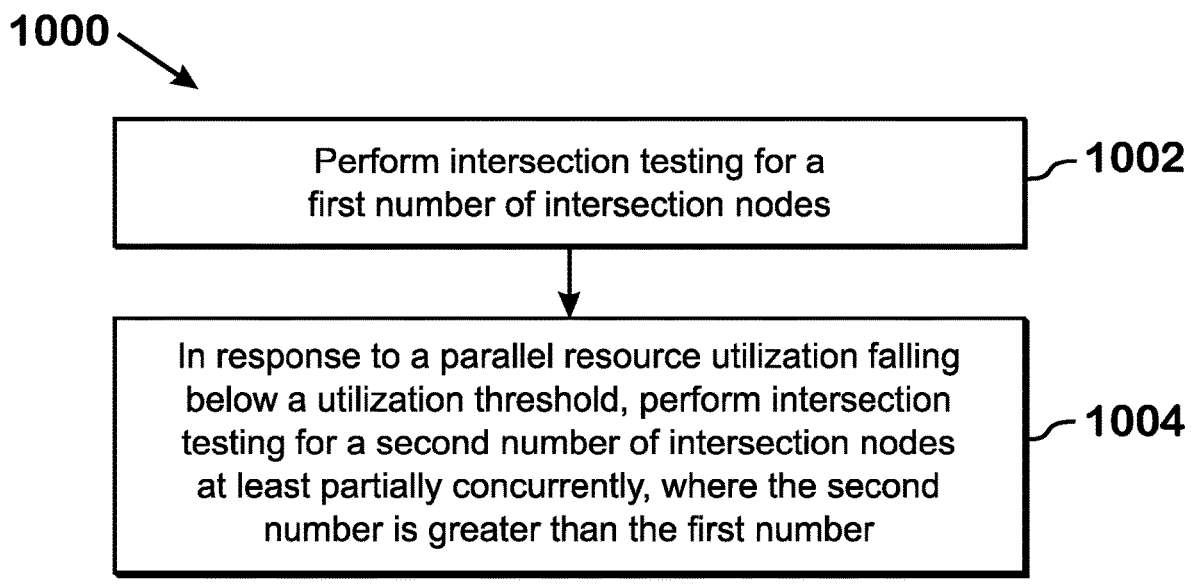
FIG. 10 is a flow diagram of a method for performing ray tracing operations, according to an example.

FIG. 10 is a flow diagram of a method 1000 for performing ray tracing, according to an example. Although described with respect to the system of FIGS. 1-9, those of skill in the art will recognize that any system configured to perform the steps of the method 1000 in any technically feasible order falls within the scope of the present disclosure.

At step 1002, a work-item performs intersection testing for a first number of intersection nodes. In some examples, step 1002 represents the single test mode of FIG. 8. In some examples, the first number of intersection nodes is one. Thus, in this example, in this iteration, the work-item requests one intersection test to be performed. In some examples, the work-item executes in parallel with other work-items in a wavefront, in a SIMD manner. Thus, in this example, each work-item of the wavefront performs one intersection test in the iteration. However, because work-items of a wavefront execute in parallel, multiple intersection tests are being performed in parallel.

At step 1004, in response to a parallel resource utilization falling below a utilization threshold, the work-items performs intersection testing for a second number of intersection nodes at least partially concurrently. The second number is greater than the first number. In some examples, the second number is two nodes. In some examples, the parallel resource utilization represents the number of work-items still executing in a wavefront. In some examples, the utilization threshold represents the parallel resource utilization value that that is low enough for a work-item to begin executing multiple intersection tests per iteration.

The "iterations" described represent iterations of a loop or other similar iterative construct. More specifically, each work-item that is still executing executes an iteration body each iteration. When the iteration body is complete, if there are still nodes to test for intersection with the ray (e.g., if the node data structure still contains nodes), the work-item executes the next iteration with new nodes. Thus, each work-item loops, executing the iterations while there are still nodes to test. After the parallel resource utilization falls below the threshold, the work-items that are still executing execute iterations with more ray intersection tests per iteration.

Each of the units illustrated in the figures represent hardware circuitry configured to perform the operations described herein, software configured to perform the operations described herein, or a combination of software and hardware configured to perform the steps described herein. For example, the acceleration structure traversal stage 304 is implemented fully in hardware, fully in software executing on processing units (such as compute units 132 of the collection of compute units 202), or as a combination thereof. In some examples, the acceleration structure traversal stage 304 is partially implemented as hardware and partially as software. In some examples, the portion of the acceleration structure traversal stage 304 that traverses the bounding volume hierarchy is software executing on a processor and the portion of the acceleration structure traversal stage 304 that performs the ray-box intersection tests and ray-triangle intersection tests is implemented in hardware. In addition, any of the stages of the ray tracing pipeline 300 are, in various implementations, implemented as hardware circuitry, software executing on a processor, or a combination thereof. In addition, any of the units of FIG. 1 or 2 are, in various implementations, implemented as hardware circuitry, software executing on a processor, or a combination thereof. Where a particular stage of the ray tracing pipeline 300 is said to be "invoked," this invocation involves performing the functionality of the hardware if the stage is implemented as hardware circuitry or executing a shader program (or other software) if the stage is implemented as a shader program that executes on a processor. The illustrated elements of the APD 116 in FIG. 2 (e.g., the scheduler 136, graphics processing pipeline 134, compute units 132, and SIMD units 136) represent hardware elements such as hardware circuitry. The accelerations structure traversal stage 500 illustrates hardware (e.g., circuitry), software (e.g., shader programs) or a combination thereof. The acceleration structure 506 represents data in memory.

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements aspects of the embodiments.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for performing ray tracing operations, the method comprising:
   detecting that a threshold number of traversal stage work-items of a wavefront have terminated; and
   in response to the detecting, increasing intersection test parallelization for non-terminated work-items.

2. The method of claim 1, further comprising:
   preserving determinism by enforcing depth first boundary volume hierarchy traversal.

3. The method of claim 1, wherein increasing the intersection test parallelization includes causing the non-terminated work-items to perform additional ray intersection tests per intersection test iteration.

4. The method of claim 3, wherein prior to the threshold number of work-items having terminated, work-items are performing one intersection test per intersection test iteration.

5. The method of claim 4, wherein intersection test iterations comprise iterations of a loop executed by the work-items.

6. The method of claim 1, wherein work-items terminate upon completing traversal of an acceleration structure for ray tracing.

7. The method of claim 1, wherein increasing the intersection test parallelization includes requesting an intersection test circuitry to perform multiple intersection tests at least partially concurrently.

8. The method of claim 7, wherein the intersection test circuitry is configured to execute multiple intersection tests in parallel.

9. The method of claim 7, wherein the intersection test circuitry is pipelined.

10. A system for performing ray tracing operations, the system comprising:
a memory configured to store instructions; and
a processor configured to execute a wavefront, the executing including:
detecting that a threshold number of traversal stage work-items of the wavefront have terminated, and
in response to the detecting, increasing intersection test parallelization for non-terminated work-items.

11. The system of claim 10, wherein the processor is further configured to:
preserve determinism by enforcing depth first boundary volume hierarchy traversal.

12. The system of claim 10, wherein increasing the intersection test parallelization includes causing the non-terminated work-items to perform additional ray intersection tests per intersection test iteration.

13. The system of claim 12, wherein prior to the threshold number of work-items having terminated, work-items are performing one intersection test per intersection test iteration.

14. The system of claim 13, wherein intersection test iterations comprise iterations of a loop executed by the work-items.

15. The system of claim 10, wherein work-items terminate upon completing traversal of an acceleration structure for ray tracing.

16. The system of claim 10, wherein increasing the intersection test parallelization includes requesting an intersection test circuitry to perform multiple intersection tests at least partially concurrently.

17. The system of claim 16, wherein the intersection test circuitry is configured to execute multiple intersection tests in parallel.

18. The system of claim 16, wherein the intersection test circuitry is pipelined.

19. A non-transitory computer-readable medium storing instructions that when executed by a processor cause the processor to perform operations including:
detecting that a threshold number of traversal stage work-items of a wavefront have terminated; and
in response to the detecting, increasing intersection test parallelization for non-terminated work-items.

20. The non-transitory computer-readable medium of claim 19, wherein the instructions further cause the processor to:
preserve determinism by enforcing depth first boundary volume hierarchy traversal.

* * * * *